United States Patent [19]

Perkins et al.

[11] 4,114,930
[45] Sep. 19, 1978

[54] SWAGED TUBE COUPLING

[75] Inventors: Donald Leroy Perkins, Kent; Bruce Lindsay Streckenbach, Seattle, both of Wash.

[73] Assignee: The Boeing Company, Seattle, Wash.

[21] Appl. No.: 700,677

[22] Filed: Jun. 28, 1976

[51] Int. Cl.² ............................................. F16L 13/14
[52] U.S. Cl. ................................. 285/334.5; 29/525; 285/382
[58] Field of Search ................. 285/382, 382.2, 382.1, 285/256, 255, 242, 259, 334.5; 29/525, 237

[56] References Cited

U.S. PATENT DOCUMENTS

| | | | |
|---|---|---|---|
| 1,723,273 | 8/1929 | Erwin | 285/255 |
| 2,319,024 | 5/1943 | Wehringer | 285/256 |
| 3,017,203 | 1/1962 | Macleod | 285/259 X |
| 3,149,860 | 9/1964 | Hallesy | 285/382 X |
| 3,425,719 | 2/1969 | Burton | 285/382.2 |
| 3,466,066 | 9/1969 | Dawson | 29/237 X |
| 3,474,519 | 10/1969 | Hallesy | 285/382 X |
| 3,528,689 | 9/1970 | Roe | 285/382.2 |
| 3,579,794 | 10/1969 | Powell | 285/382.2 X |
| 3,674,292 | 7/1972 | Demler, Sr. | 285/382 X |
| 3,827,727 | 8/1974 | Moebius | 285/382.2 X |
| 3,837,686 | 9/1974 | Powell | 285/382 X |
| 3,893,720 | 7/1975 | Moebius | 285/382.2 X |

FOREIGN PATENT DOCUMENTS

| | | | |
|---|---|---|---|
| 352,206 | 3/1961 | Switzerland | 285/242 |
| 1,310,367 | 3/1973 | United Kingdom | 285/242 |

*Primary Examiner*—Thomas F. Callaghan
*Attorney, Agent, or Firm*—Morris A. Case; Bernard A. Donahue

[57] ABSTRACT

A coupling to support tubing both inside and outside. The end of the tubing is swaged by a press-fit sleeve onto a tubular insert having exterior serrations and the tubing becomes permanently held between the insert and the sleeve. In a variation a ring encircles the end of the tubing. This ring and the tubing are swaged together to become fastened between the insert and the sleeve.

2 Claims, 4 Drawing Figures

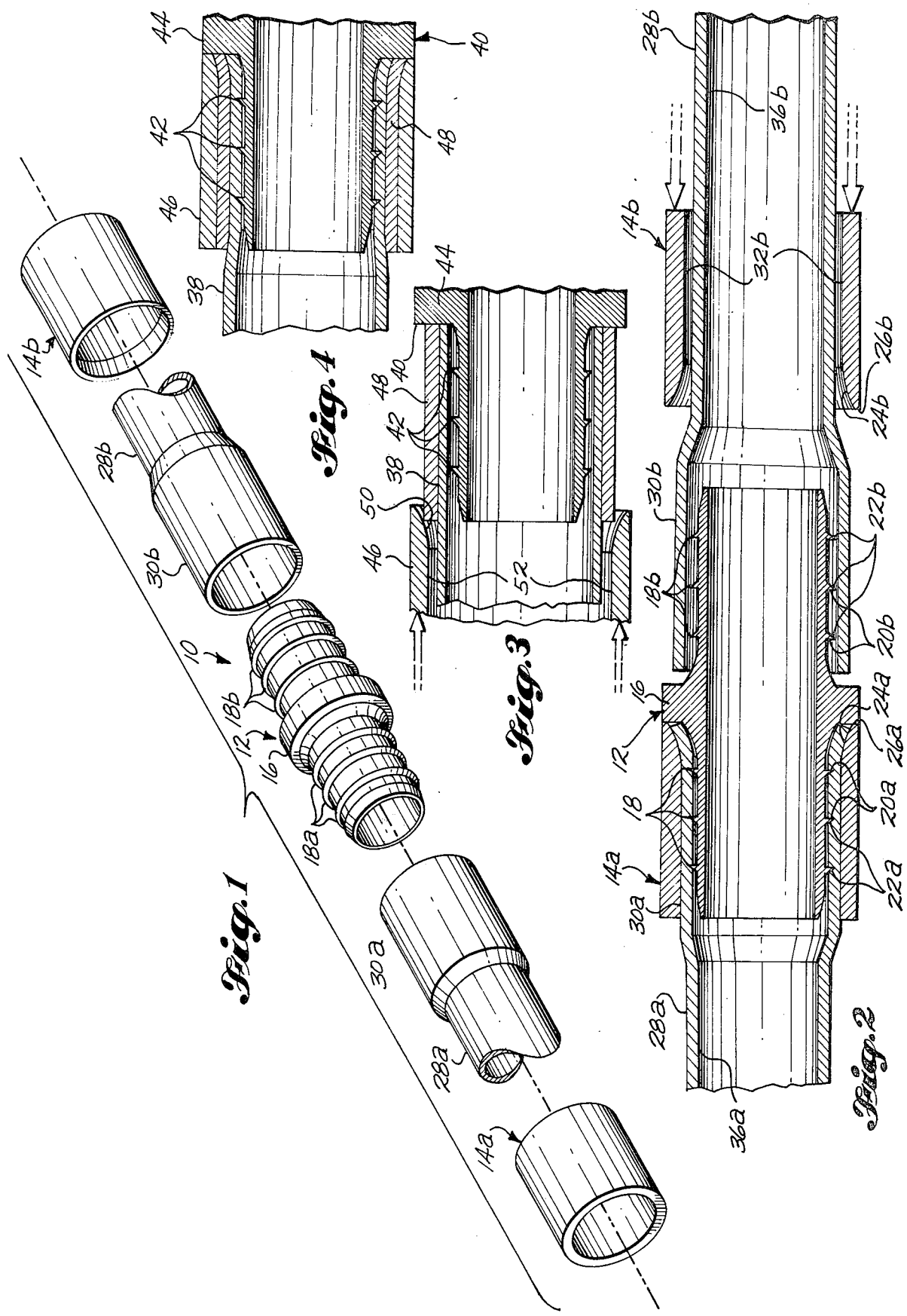

SWAGED TUBE COUPLING

BACKGROUND OF THE INVENTION

In joining together sections of tubing, either in production or as required to repair, it is important to obtain structural integrity under all conditions to which the joint will be subjected. In those cases where the tubing is used to contain a fluid under pressure, it is also imperative the coupling be leak proof. It is known to use several different coupling devices where a sleeve is placed over tubing ends to be joined and a threaded or swage type of means is used to press the sleeve into the tubing to effect a connection. In U.S. Pat. No. 3,466,066 to Dawson a tubular body has a taper toward the outer end. A tapered tubing abuts against the outer end of the body and a tapered sleeve moves toward the center of the body to cover the tubing and the body and to maintain the abutting relationship between the two parts. In U.S. Pat. No. 3,877,735 to Demler two ends of plastic pipe are joined with exterior serrated insert members having a flange at one end, clips which retain the abutting relationship of the flanges, a resilient deformable sleeve to bridge the pipe ends being joined, and rigid rings to deform the relilient sleeve to crimp the plastic pipe to the insert.

SUMMARY OF THE INVENTION

A union or coupling consists of a double ended tubular insert and a pair of press-fit sleeves. The insert has a series of exterior serrations around the outer periphery and on both sides of an integral outwardly extending flange located intermediate the ends of the insert. The sleeves each have a gradually decreasing internal diameter extending part way inwardly from at least one end of the ring. The insert enters into tubing expanded part way in from the end of the tubing and the sleeve advances toward the flange on the insert to swage the tubing onto the serrations of the insert to firmly hold the tubing between the insert and the sleeve.

In another embodiment, the tubing ends are not expanded and a ring is placed to encircle the tubing ends and to be swaged along with the tubing between the insert and the sleeve.

DESCRIPTION OF THE DRAWINGS

FIG. 1 is a fragmented exploded perspective view of the coupling of this invention.

FIG. 2 is a fragmented side elevation sectional view of the invention of FIG. 1 with the right half of the coupling assembled ready for joining and the left half of the coupling completely joined.

FIG. 3 shows a fragmented side elevation sectional view of another embodiment of the coupling of this invention and with the coupling assembled ready for joining.

FIG. 4 shows a fragmented side elevation sectional view of the embodiment of FIG. 3, but with the coupling completely joined.

DETAILED DESCRIPTION

The coupling 10 of this invention as shown in FIGS. 1 and 2 include tubular insert 12 and a pair of sleeves 14a and 14b. The insert has an outwardly extending flange 16. A series of exterior serrations 18a extending around the outer periphery of the insert on one side of the flange and another series of serrations 18b extend around the outer periphery of the insert on the other side from the flange. These serrations preferably are as shown in the drawings with the side nearest the flange 20a and 20b extending essentially normal to the outer periphery and the side away from the flange 22a and 22b extending on a plane inclined toward the flange to meet on a sharp cutting edge. The sleeves have a decreasing internal diameter 24a and 24b extending at least part way in from ends 26a and 26b respectively. This embodiment is used when the tubing 28a and 28b to be joined have the ends expanded as at 30a and 30b.

The installation of the coupling 10 is best shown in the right hand portion of FIG. 2 where the tubing 28b with expanded end 30b is shown encircling the right half of the insert 12. The insert enters the tubing with a non-interference fit, and approaches or abuts against the side of the flange 16. Previous to placing the insert, the sleeve 14b is placed over the tubing with end 26b facing the flange. Next the tubing is expanded with any known means such as by forcing a mandrel into the end to expand the tubing and to allow entry of the insert. Once the tubing end approaches the flange, the coupling is assembled ready for joining and the sleeve is advanced toward the flange to force-fit or swage the expanded part of the tubing to firmly hold the tubing between the insert and the inside diameter 32b of the sleeve 14b. Due to the swaging, the sharp cutting edges of the serrations on the insert penetrate part way through the tubing to effect structural integrity and a leak proof seal. The completed coupling is then as shown in the left hand portion of FIG. 2. In the joined state the inside diameter 34 of the insert is of about the same diameter as the inside diameter 36a and 36b of the unexpanded tubing to give a low pressure drop across the coupling. The inside diameter of the sleeve is sized to slide over the unexpanded tubing and to swage the expanded tubing between the serrations on the insert and the inside of the sleeve.

FIGS. 3 and 4 show a different embodiment of the coupling wherein the tubing 38 is not expanded prior to being coupled. In this embodiment, insert 40 has serrations 42 around the outer periphery of the insert on each side of an essentially centrally located flange 44. The serrations are sized to permit a non-interference fit inside the tubing. To effect this coupling, a sleeve 46 is placed over tubing 38. Next a ring 48 is placed to cover the end of the tubing with both abutting against the side of flange 44 to assemble the coupling prior to joining. The ring 46 with inclined surface 50 has an inside diameter 52 sized to slide over the tubing, to swage the ring and the tubing simultaneously to become wedged between the serrations on the insert and the inside diameter of the sleeve. In these press-fit couplings the tubing and also the ring, when used, are of a hardness less than the hardness of the insert and the sleeve to become deformed between those parts with the insert in compression and the sleeve in tension.

It is understood the coupling of this invention may be used to join a pipe or a tube as the term tubing covers either or both. It would be apparent to one skilled in the art that a coupling in the form of an elbow, a tee or a cross may be used as well as a straight through joint.

We claim:

1. An apparatus for joining to an end of tubing comprising: tubing expanded to a larger diameter for a distance back from the end; a tubular insert having an outer periphery with a flange, a series of serrations and a surface tapering downward from the flange to the first serration and with the serrations having a side nearest the flange extending radially and the side away from the flange inclined toward the flange to meet on a sharp cutting edge and sized to provide a non-interference fit into the expanded end of tubing; and a sleeve having a gradually decreasing internal diameter to extend part way inward from an end facing the flange, and an internal diameter sized to slide over the unexpanded tubing and to swage and firmly hold the tubing, which is of a hardness less than the sleeve and insert, between the sleeve and the insert with the end portion of the tubing flared radially outward and engaging the tapered surface on the insert and the decreasing internal diameter portion of the sleeve, and with the tubing penetrated part way through by the sharp edge of the serrations when the sleeve is pressed toward the flange.

2. An apparatus for joining to an end of tubing comprising: a tubing member; a tubular insert having an outer periphery with a flange, a series or serrations and a surface tapering downward from the flange to the first serration and with the serrations having a side nearest the flange to extend radially and a side away from the flange inclined toward the flange to meet on a sharp edge, and sized to provide a non-interference fit into an end of the tubing; a ring sized to slide over the tubing; and a sleeve having a gradually decreasing internal diameter to extend part way inward from an end facing the flange, and the sleeve sized to compress the ring and the tubing, both of which are of a hardness less than the hardness of the sleeve and the insert, between the sleeve and the insert with the tubing partially penetrated by the sharp cutting edges of the serrations and the end portion of the tubing and ring flared radially outward between the tapered surface on the insert and the inclined surface of the sleeve, when the sleeve is pressed toward the flange on the insert.

* * * * *